United States Patent [19]
Thiel et al.

[11] Patent Number: 5,521,704
[45] Date of Patent: May 28, 1996

[54] APPARATUS AND METHOD FOR MEASURING ABSOLUTE MEASUREMENTS HAVING TWO MEASURING INTERFEROMETERS AND A TUNABLE LASER

[76] Inventors: Jurgen Thiel, Siemensstrasse 11, D-52074 Aachen; Dieter Michel, Langauenstrasse 12, D-83278 Traunstein; Andreas Franz, Herzog-Ludwig-Str. 31, D-83308 Trostberg, all of Germany

[21] Appl. No.: 237,354

[22] Filed: May 2, 1994

[30] Foreign Application Priority Data

May 3, 1993 [DE] Germany ............... 43 14 488.8

[51] Int. Cl.$^6$ ............... G01B 9/02; G01B 11/02
[52] U.S. Cl. ............... 356/349; 356/358
[58] Field of Search ............... 356/345, 349, 356/358

[56] References Cited

U.S. PATENT DOCUMENTS

| | | | |
|---|---|---|---|
| 3,647,302 | 3/1972 | Zipin et al. | 356/349 |
| 4,596,466 | 6/1986 | Ulrich | 356/345 |
| 4,813,783 | 3/1989 | Torge | 356/358 |
| 4,974,961 | 12/1990 | Jackson et al. | 356/345 |
| 4,984,898 | 1/1991 | Höfler et al. | 356/358 |
| 5,189,677 | 2/1993 | Yry | 356/349 |
| 5,301,010 | 4/1994 | Jones et al. | 356/345 |

FOREIGN PATENT DOCUMENTS

| | | |
|---|---|---|
| 3404963C2 | 8/1985 | Germany . |
| 3421213C2 | 12/1985 | Germany . |
| 3608075C2 | 10/1986 | Germany . |
| 8502346.9 | 8/1989 | Germany . |
| 3918812 | 12/1989 | Germany . |
| 3836174 | 5/1990 | Germany . |
| 3841742 | 6/1990 | Germany . |
| 4039955 | 6/1992 | Germany . |
| 4100773 | 7/1992 | Germany . |

*Primary Examiner*—Samuel A. Turner
*Assistant Examiner*—Jason D. Eisenberg
*Attorney, Agent, or Firm*—Willian Brinks Hofer Gilson & Lione

[57] ABSTRACT

An apparatus and method for measuring absolute measurements having two measuring interferometers and a tunable laser emitting a laser beam. The two measuring interometers each have their own measuring lines and are supplied with the beam from one and the same laser. A reference line is established from the arithmetic sum or difference of the two measuring lines and is maintained at a constant value.

19 Claims, 3 Drawing Sheets

APPARATUS AND METHOD FOR MEASURING ABSOLUTE MEASUREMENTS HAVING TWO MEASURING INTERFEROMETERS AND A TUNABLE LASER

BACKGROUND OF THE INVENTION

1. Field of the Invention

The invention concerns an interferometric measuring process for absolute measurements, in particular for absolute distance measurements, employing a laser which can be tuned without mode-jumping in at least one wavelength range and a suitable laser interferometer configuration for the measuring process in accordance with one of the preceding claims, incorporating a laser which is tunable without mode-jumping in at least one wavelength range.

2. Description of the Prior Art

A device for measuring the distance of an object via the use of a laser beam, consisting of a measuring interferometer and a reference interferometer, is known from DE-PS 36 08 075. Both interferometers are supplied with the beam from the same laser. By means of frequency modulation of the laser beam, a so-called reference beat wave is generated from each 2 mutually interfering component beams, whereby the respective numbers of waves in the measuring beat wave and the reference beat wave are determined using a measuring device, and the measured distance is determined on the basis of the ratio between the numbers of these waves and the known reference distance.

One disadvantage of this process is that the phase of the reference beat wave cannot be determined at a resolution greater than approximately 1/10 of the total wavelength of the beat wave. This resolution falls well short of the resolutions attainable with other methods. A further disadvantage of this process is that it is unsuitable for measured distances which vary in an extreme range. However, this requirement is often relevant for plant control systems in production processes, for example.

SUMMARY OF THE INVENTION

On the basis of these disadvantages, the object of the present invention is to increase both the measuring accuracy and the attainable measuring range with a distance-measuring process and device of the above-specified type.

This object is attained with the measuring process in accordance with the present invention by virtue of the fact that two measuring interferometers with their own respective measuring lines which are subjected to the laser beam from one and the same laser are employed, whereby the reference line, $L_{Ref}$, which is established from the arithmetic sum or difference of the two measuring lines, $L_1$ and $L_2$, is maintained at a constant value, that at least one interference signal is generated from each pair of interfering component beams, said signal being measured by photodetectors, that the air wavelength of the laser beam is continuously tuned within a mode-jump-free wavelength range between the values $\lambda_1$ and $\lambda_2$, and that the integral phase changes, $\Delta\Phi_1$ and $\Delta\Phi_2$, of the respective interference signals are detected during wavelength modulation and the length of one of the measuring lines is determined according to the formula $$L_{1,2} = L_{Ref} \frac{1}{\frac{\Delta\Phi_{2,1}}{\Delta\Phi_{1,2}} \pm 1}.$$

An advantage of this measuring process over the known processes is that the length of the reference line can be scaled with the lengths of the two measuring lines, i.e. the quantity of the distance to be determined. This ensures that the total attainable measuring resolution is also maintained when extremely varied measured distances apply.

The measuring process in accordance with the present invention can furthermore be configured in such a manner that the wavelength modulation is effected via the operating current of the laser.

In order to minimize the time required for a measuring cycle and, subsequently, to reduce the influence of errors to a minimum, it may be expedient to effect wavelength variation by means of current modulation only, and not by varying the temperature of the heat sink of the laser, for example, which should preferably be a solid-state laser. Although the continuous tuning range is approximately 5 times greater when temperature variation is employed than when current variation is used, the former process requires several seconds, in comparison to several milliseconds for current modulation.

In accordance with the present invention, the attainable measuring resolution can be further increased by determining the respective residual phases in the range of the wavelength values $\lambda_1$ and $\lambda_2$. The term 'residual phases' refers to the fractional phase values at the ends of the complete wavelength interval.

In accordance with the present invention, a further increase in the resolution for the phase-measuring process can be attained by determining the phase change on the basis of the elliptical Lissajous figure which is formed from two interference signals in phase quadrature.

Evaluation of the Lissajous ellipse permits extremely accurate determination of the phases of the interference signals, and the residual phases in particular. However, to enable this evaluation to be carried out in an effective manner, it must be ensured that the light intensities of the interference signals in phase quadrature which are recorded by the photodetectors lie on a circular Lissajous curve in a biaxial representation. The measured phase values do not generally lie on a circle, however, but on an ellipse, which, on account of the power characteristics of a solid-state laser, is not closed when current modulation is employed, but expands in a spiral shape. The elliptical shape is due primarily to phase displacement which is not precisely 90°, unequal amplitude factors of the two interference signals in phase quadrature and the occurrence of an offset for only one of the two interference signals. A method of correcting the measured phase values is provided by an established procedure according to 'Heydemann', whereby the ellipticity of the Lissajous curve is transformed into a circle, by means of transformation of the principal axes. Angular resolutions of approximately 1° are attainable on the basis of a Lissajous curve corrected in this manner.

This means that, in addition to absolute interferometric measurements, incremental distance measurements can also be carried out and, as is known, the insertion of a quarter-wave plate in at least one of the measuring lines also enables the direction of the relative movements of the object to be measured to be determined.

The measuring process in accordance with the present invention can further be configured in such a manner that the phase changes $\blacktriangle\Phi_1$ and $\blacktriangle\Phi_2$ are determined via the same trigger signal, by means of oversampling.

The integral phase change is generally measured in the form of a step-type digitalisation curve. The number of digitalisation steps employed in absolute interferometry using the solid-state lasers which are commercially available today is generally extremely small, and smaller than applies in conventional interferometry by a factor of $$\frac{\lambda_{1,2}}{\lambda_2 - \lambda_1} \approx 4,000.$$

When employing digital data acquisition, an increase in the phase resolution can be attained via oversampling by the electronic measuring system at a constant sampling rate, whereby the increase in resolution is proportional to the ratio of the step length to the length of one sampling interval. The wavelength end ranges within which oversampling is effected correspond to a maximum of ½ of the total wavelength interval.

The measuring process in accordance with the present invention can further be configured in such a manner that in one of the measuring interferometers at least, mutually phase-displaced interference signals are generated in each case from a minimum of two interfering component beams, whereby each of these signals is measured using a photodetector.

As is known, interference signals in phase quadrature, for example, can be generated by inserting a quarter-wave plate in the beam path. An advantage of this procedure is that, in addition to absolute interferometric measurements, incremental distance measurements can also be carried out, whereby, as is known, the direction of the relative movements of the object to be measured can also be determined by inserting a quarter-wave plate in at least one of the measuring lines.

Finally, the measuring process in accordance with the present invention can be configured in such a manner that a second laser emitting a laser beam with at least one additional discrete wavelength, $\lambda_3$, or a multi-wavelength laser is employed, the laser beam of which is also input into the respective interferometers, whereby the laser wavelengths are operated alternately in succession, and whereby wavelength value $\lambda_3$ is tuned in accordance with wavelength values $\lambda_1$ and $\lambda_2$ in such a manner that a synthetic beat of a specific beat wavelength is formed by subsequently superposing the two interference signals with the aid of an electronic device or a computer.

This measure enables a further increase in the linear resolution of the measuring process in accordance with the present invention. On the basis of the additional discrete wavelength, a beat wavelength can be generated, for example, which is greater than the measuring uncertainty resulting from the method of continual tuning of the wavelength.

The object of the present invention is attained by a suitable laser interferometer configuration for the measuring process in accordance with the present invention by virtue of the fact that two measuring interferometers are provided, each with its own measuring line, whereby the reference line established from the arithmetic sum or difference of the two measuring lines possesses a constant length, each measuring interferometer possessing a beam-splitter, one reflector fixed in space and one movable reflector, and being subjected to the beam of one and the same laser by means of a primary beam-splitter and at least one additional reflector or optical waveguide, whereby an interference signal is formed for each interferometer and detected by a photodetector.

The beam-splitters of the two interferometers may determine the ends of the reference line, whereby the respective measuring reflectors are movable. Alternatively, a configuration is also possible whereby the beam-splitters of the two interferometers are movable, while the respective measuring reflectors determine the ends of the reference line.

With the laser interferometer configuration in accordance with the present invention, provision can also be made for the laser to be a solid-state laser.

With the laser interferometer configuration in accordance with the present invention, provision can also be made for pre-amplifiers to be incorporated for the interference signals of the measuring interferometers, whereby the gain of these pre-amplifiers is inversely proportional to the laser power. Down-line of the pre-amplifiers, the signal levels are then independent of the laser power and, subsequently, of the wavelength.

With the laser interferometer configuration in accordance with the present invention, provision can also be made for at least one of the measuring interferometers to have two interference signals in phase quadrature, whereby each of these signals is detected by photodetectors.

Firstly, this measure renders possible the phase evaluation method on the basis of the Lissajous curves, as is required by measuring process.

Secondly, as is known, the insertion of a quarter-wave plate in one of the measuring lines also enables the direction of the relative movements of the movable reflector(s) to be determined.

With the laser interferometer configuration in accordance with the present invention, provision can also be made for the measuring lines to be configured in alignment on an axis, whereby the rear sides of the respective movable reflectors are rigidly interlinked and said reflectors are movable in linear direction along the measuring lines between the beam-splitters of the two measuring interferometers, and whereby the reference line established from the arithmetic sum of the two measuring lines possesses a constant length.

With the laser interferometer configuration in accordance with the present invention, provision can also be made for the measuring lines to be configured along parallel axes, whereby the movable retroreflectors are rigidly interlinked and movable in linear direction, and whereby the reference line established from the arithmetic difference of the two measuring lines possesses a constant length.

With the laser interferometer configuration in accordance with the present invention, provision can also be made for the measuring lines to be configured in alignment on an axis, whereby a reflector which is movable in linear direction along the measuring lines is located between the beam-splitters of the two measuring interferometers, and whereby the reference line established from the arithmetic sum of the two measuring lines possesses a constant length. In this case, the interferometer arms are configured in such a manner as to enable the use of one common reflector.

With the laser interferometer configuration in accordance with the present invention, provision can also be made for a counter or an electronic counting device and an electronic analysis system or a computer to be incorporated, for the purpose of automating the phase analysis process.

This enables all the steps involved in the measuring process to be automated and, subsequently, successive distance measurements to be carried out.

Finally, with the laser interferometer configuration in accordance with the present invention, provision can be made for at least part of the configuration to take the form of an integrated optical system and parts of the light path to be configured as optical waveguides.

Miniaturisation is made possible by the exclusive use of components in standard use in the field of integrated optical systems, and opens up an even more extensive scope of applications for the laser interferometer configuration in accordance with the present invention.

In the following part of this patent application, the measuring process in accordance with the present invention is described in detail by reference to an embodiment of the invented laser interferometer configuration.

DETAILED DESCRIPTION OF THE PRESENTLY PREFERRED EMBODIMENTS

Figure 1:
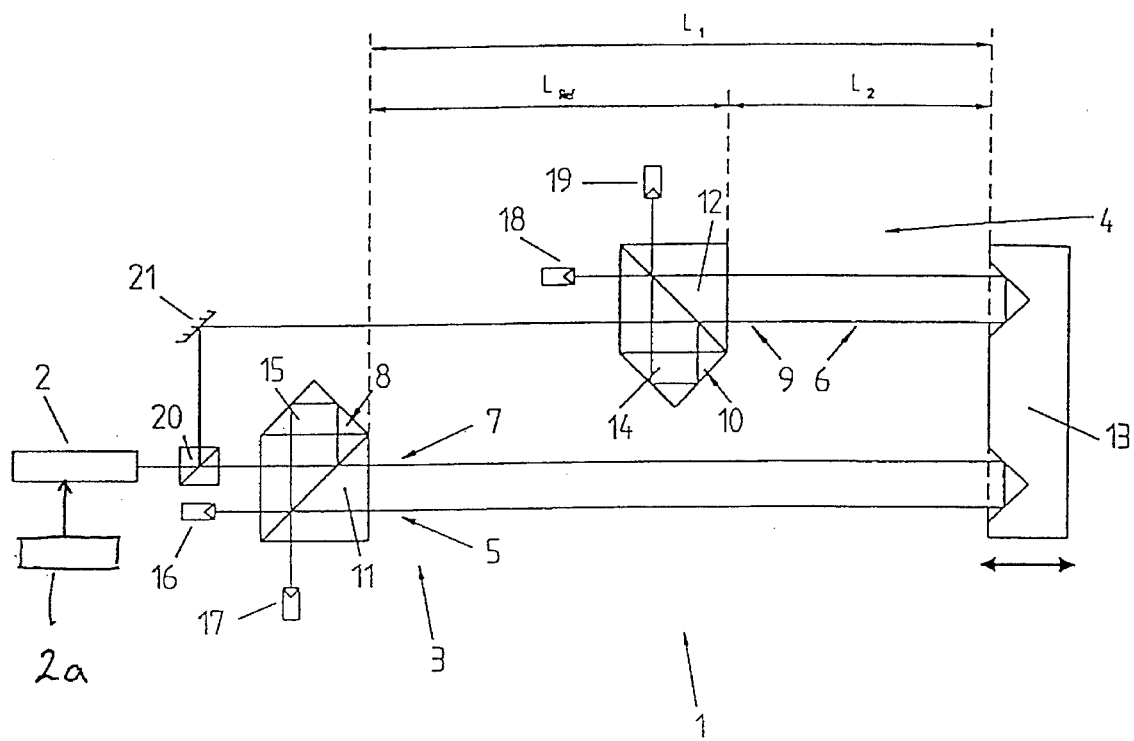
FIG. 1 shows an embodiment of the laser interferometer configuration in accordance with the present invention, whereby the reference line consists of the difference between the two measuring lines.

The laser interferometer configuration for absolute measurements shown in FIG. 1 incorporates a solid-state laser, 2, which is tunable without mode-jumping in at least one wavelength range, and which is modulated in a mode-jump-free wave range of its characteristic by means of an operating current supply unit (2a). The configuration further includes two measuring interferometers, 3, 4, the interferometer arms, 5, 6, of which form the actual measuring lines (5, 6). In this example, the reference line, $L_{Ref}$, which is established from the arithmetic difference of the two measuring lines, $L_1$ and $L_2$, 5,6, possesses a constant length. For the purpose of generating at least two mutually interfering component beams, 7, 8 and 9, 10, for each measuring line, each measuring line is provided with beam-splitters, 11, 12, a movable retroreflector unit, 13, consisting of two retroreflectors, $13_1$ and $13_2$, and two fixed retroreflectors, 14, 15. The respective interfering component beams, 7,8 and 9, 10, are detected by means of photodetectors, 16, 17 and 18, 19. The photodetectors, 16, 17, 18, 19, are further connected to an electronic counting device (not shown), and the solid-state laser, 2, is connected to a device (not shown) for controlling the laser wavelength. The two measuring interferometers, 3, 4, are supplied with the beam from one and the same solid-state laser, 2, by means of a primary beam-splitter, 20, and a reflector or mirror, 21. The measuring lines, 5, 6, are configured along parallel axes, whereby the movable retroreflector, 13, is movable in linear direction parallel to the measuring lines, 5, 6. When the retroreflector, 13, is moved, the reference line established from the difference of the two measuring lines, 5, 6, possesses a constant length. The exclusive use of standard components enables the entire laser interferometer configuration, 30, to be configured as an integrated optical system.

Figure 2:
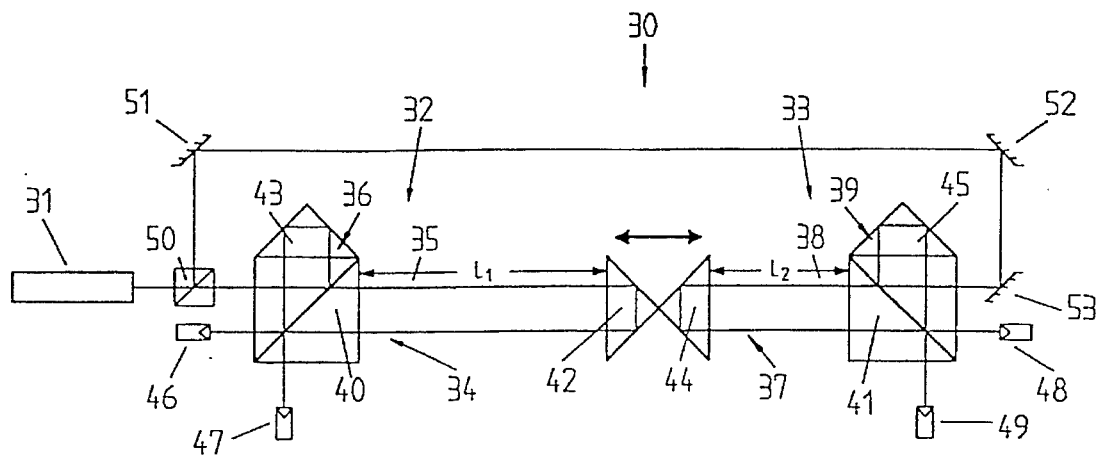
FIG. 2 shows an embodiment of the laser interferometer configuration in accordance with FIG. 1, whereby the reference line is established from the sum of the two measuring lines, however.

The laser interferometer configuration, 30, for absolute measurements which is shown in FIG. 2 incorporates a solid-state laser, 31, which is tunable without mode-jumping in at least one wavelength range, whereby this laser, 31, is modulated in a mode-jump-free wavelength range of its characteristic by means of an operating current supply unit (3a). The configuration further includes two measuring interferometers, 32, 33, the interferometer arms, 34, 37, of which form the actual measuring lines (34, 37). In this example, the reference line established from the arithmetic sum of the two measuring lines, 34, 37, possesses a constant length. For the purpose of generating at least two mutually interfering component beams, 35, 36 and 38, 39, for each measuring line, each measuring line is provided with beam-splitters, 40, 41, and two retroreflectors, 42, 43 and 44, 45. The respective interfering component beams, 35, 36 and 38, 39, are detected by means of photodetectors, 46, 47 and 48, 49. The photodetectors, 46, 47, 48, 49, are further connected to an electronic counting system (not shown), and the solid-state laser, 31, is connected to a device (not shown) for controlling the laser wavelength. The two measuring interferometers, 32, 33, are supplied with the beam of one and the same solid-state laser, 31, by means of a primary beam-splitter, 50 and three reflectors or mirrors, 51, 52, 53. The measuring lines, 34, 37, are configured on aligned axes, whereby the movable retroreflectors, 42, 44 are joined together to form a rigid unit, and are movable in linear direction along the measuring lines, 34, 37, whereby reference line established from the sum of the two measuring lines, 34, 37, possesses a constant length. The exclusive use of standard components enables this laser configuration, 30, also to be configured as an integrated optical system.

Figure 3:
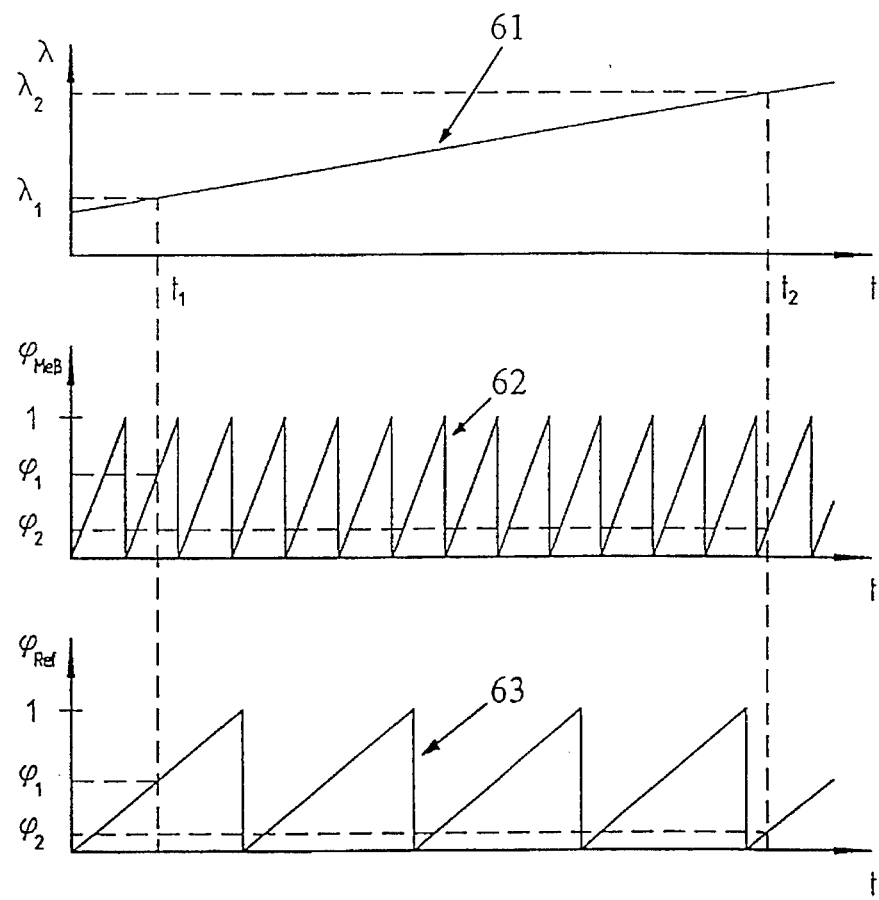
FIG. 3 shows an example of the measuring process, in the form of the wavelength modulation and two resultant phase characteristics of the interference signals in the two measuring interferometers.

The top diagram of FIG. 3 shows a linearly modulated wavelength curve, 61, whereby a measuring cycle beginning at time $t_1$ and wavelength value $\lambda_1$ ends at time $t_2$ and wavelength value $\lambda_2$. These two wavelength values are selected so as to ensure that the wavelength interval which lies between them is within a mode-jump-free range of the characteristic of the solid-state laser, 31. The phase changes, 62, 63, of the interference signals, 35, 36, 38, 39, which occur in the measuring interferometers, 32, 33, during the wavelength modulation are shown in the bottom two diagrams of FIG. 3. The saw-tooth profile of these curves, 62, 63, results from the fact that in the course of tuning of the wavelength the phase changes linearly in each case until a new order of interference is passed over. The difference in the number of phases of the interference signals measured in the two measuring interferometers, 32, 33, which are passed through results from the different lengths of the measuring lines of measuring interferometers 32 and 33. The integral phase change, $\Delta\phi$, is obtained by simply counting the saw-tooth peaks and adding the residual phases determined at the end points of the measuring curves, 62, 63. Measured distance 34 (or 37) is then determined on the basis of the integral phase changes measured in the two measuring interferometers, 32, 33 and the known length of the reference line, according to the formula specified in claim 1. The manner by which the respective residual phases are determined is explained below.

Figure 4:
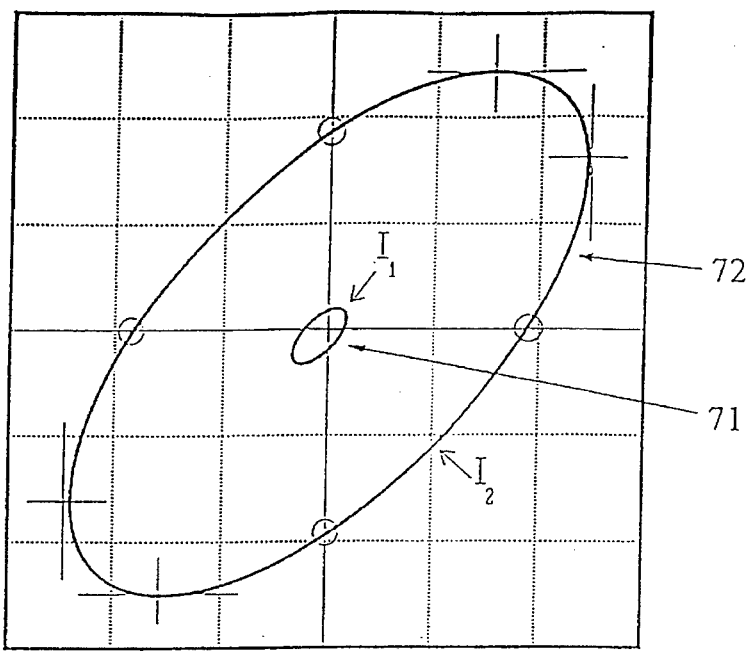
FIG. 4 shows the Lissajous ellipse of two interference signals in phase quadrature.

FIG. 4 shows a Lissajous ellipse, determined via analytical adaption to two interference signals in phase quadrature, which are detected by means of the photodetectors 46, 47, and 48, 49. The inner Lissajous curve, 71, represents the phase characteristic of the two interference signals of a wave period at the beginning of a measuring cycle, while the outer curve, 72, represents the phase characteristic at the end of a measuring cycle. The different radii result from the fact that the power characteristic of the solid-state laser, 31, increases with the wavelength. Each of the residual phases, $\phi_1$ and $\phi_2$, lies on one of these curves and can thus be determined very accurately on the basis of the curves. For this purpose, it will generally be expedient to transform the ellipse into a circle beforehand, by means of the previously cited method, however.

Figure 5:
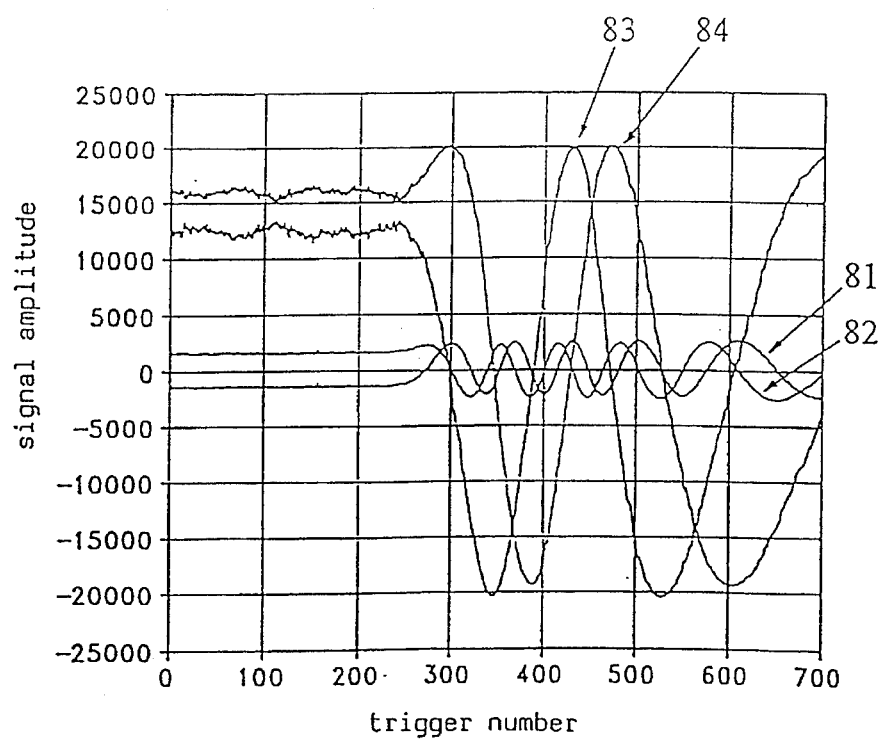
FIG. 5 shows a signal characteristic for the purpose of phase determination in accordance with the method of variation of the laser wavelength in the range of the residual phases.

Finally, FIG. 5 shows a signal characteristic for the purpose of phase determination according to the method of varying the laser wavelength in the range of the wavelength end values. In addition to the phase values determined here in static mode, the phases of a complete period are also recorded. The diagram in FIG. 5 shows this procedure for items of phase data, 81, 82, of the interference signals in phase quadrature which are recorded at the beginning of a measuring cycle and for data items, 83, 84, recorded accordingly at the end. These curves, 81, 82, 83, 84, are recorded by varying the operating current of the solid-state laser, 31, thereby inducing a phase change over at least one period. A Lissajous ellipse is adapted to the data which is determined in this manner, and this ellipse can then be evaluated in accordance with the method shown in FIG. 4.

What is claimed is:

1. A method for making absolute measurements, said method comprising the steps of:

providing a tunable laser emitting a laser beam having a wavelength;

providing a first measuring interferometer having a first measuring line $L_1$ of variable length;

providing a second measuring interferometer having a second measuring line $L_2$ of variable length;

directing said laser beam onto said first measuring interferometer and said second measuring interferometer to cause interference signals in said first measuring interferometer and said second measuring interferometer;

detecting interference signals of said first and said second measuring interferometers;

modulating the wavelength of said laser from said first wavelength $\lambda_1$ to a second wavelength $\lambda_2$;

detecting integral phase changes $\Delta\phi_1$ and $\Delta\phi_2$ of said detected interference signals for said first and second measuring interferometers;

calculating a reference length $L_{REF}$ from either an arithmetic sum or difference of said first and second measuring lines, $L_1$ and $L_2$, respectively; and calculating either one of said first and second measuring lines according to the equation $$L_{1,2} = L_{Ref} \frac{1}{\frac{\Delta\Phi_{2,1}}{\Delta\Phi_{1,2}} \pm 1}.$$

2. A method according to claim 1 wherein said wavelength modulation is effected by modulating an operating current of said laser.

3. A method according to claim 1 wherein in at least one of said measuring interferometers mutually phase-displaced interference signals are generated from a minimum of two interfering component beams whereby each of said phase-displaced interference signals is measured using a photodetector.

4. A method according to claim 3 further comprising the step of calculating said phase changes from an elliptic Lissajous figure created from two interference signals in phase quadrature.

5. A method according to claim 1 wherein residual phase changes are determined at said first wavelength $\lambda_1$ and at said second wavelength $\lambda_2$.

6. A method according to claim 5 wherein in at least one of said measuring interferometers mutually phase-displaced interference signals are generated from a minimum of two interfering component beams whereby each of said phase-displaced interference signals is measured using a photodetector.

7. A method according to claim 6 further comprising the step of calculating said phase changes from an elliptic Lissajous figure created from two interference signals in phase quadrature.

8. A method according to claim 1 wherein said integral phase changes $\Delta\phi_1$ and $\Delta\phi_2$ are determined using the same trigger signal by means of oversampling.

9. A method according to claim 1 wherein a second laser or a multi-wavelength laser is employed, which additionally emits a laser beam with at least one additional discrete wavelength, $\lambda_3$, which is also input into the respective interferometers, whereby the laser wavelengths are operated alternately in succession, and whereby wavelength value $\lambda_3$ is tuned in accordance with wavelength values $\lambda_1$ and $\lambda_2$ in such a manner that a synthetic beat of a specific beat wavelength is formed by subsequently superposing the two laser beams with the aid of an electronic device or a computer.

10. A method according to claim 9 further comprising the step of amplifying said interference signals of said first and said second measuring interferometers with pre-amplifiers, the gain of said pre-amplifiers being inversely proportional to the laser power.

11. A method according to claim 1 wherein a primary beam splitter directs said laser onto said first and said second measuring interferometers, and said first and said second measuring interferometers include;

a beam splitter;

a first reflector fixed in space; and a second moveable reflector.

12. A method according to claim 11 wherein said laser is a solid-state laser.

13. A method according to claim 11 further comprising the step of amplifying said interference signals of said first and said second measuring interferometers with pre-amplifiers, the gain of said pre-amplifiers being inversely proportional to the laser power.

14. A method according to claim 11 wherein at least one of said first and second measuring interferometers has two interference signals in phase quadrature, each signal being detected by means of photodetectors.

15. A method according to claim 11 wherein said first and said second measuring lines $L_1$ and $L_2$ are configured in alignment on an axis, whereby said second movable reflectors are rigidly interlinked and said second movable reflectors are movable in linear direction along the measuring lines between said beam-splitters of said first and said second measuring interferometers, and said reference line $L_{REF}$ is calculated from the arithmetic sum of said first and said second measuring lines.

16. A method according to claim 11 wherein said first and said second measuring lines extend along parallel axes, whereby said second movable reflectors are rigidly interlinked and movable in a linear direction, and said reference line $L_{REF}$ is calculated from the arithmetic difference of the two measuring lines.

17. A method according to claim 11 wherein said first and said second measuring lines extend in alignment on an axis, whereby said second movable reflector which is movable in linear direction along said first and said second measuring lines is located between said beam-splitters of said first and said second measuring interferometers, and said reference line $L_{REF}$ is calculated from the arithmetic sum of said first and said second measuring lines.

18. A method according to claim 11 further comprising the step of automating the phase analysis process by providing an electronic counting device and an electronic analysis system.

19. A method according to claim 11 wherein at least a portion of said first and said second measuring interferometer is formed as an integrated optical system.

* * * * *